United States Patent [19]

Hurd

[11] Patent Number: 4,973,968
[45] Date of Patent: Nov. 27, 1990

[54] RADAR SYSTEM FOR DETERMINING FIRST TIME AROUND TARGETS FROM MULTIPLE TIME AROUND TARGETS

[75] Inventor: David L. Hurd, Hampshire, England

[73] Assignee: Plessey Overseas Limited, Ilford, England

[21] Appl. No.: 313,502

[22] Filed: Feb. 22, 1989

Related U.S. Application Data

[63] Continuation-in-part of Ser. No. 33,983, Apr. 2, 1987, abandoned.

[51] Int. Cl.$^5$ .................. G01S 13/20; G01S 13/70
[52] U.S. Cl. ............................. 342/137; 342/95
[58] Field of Search ................ 342/137, 95, 90

[56] References Cited

U.S. PATENT DOCUMENTS

| | | | |
|---|---|---|---|
| 3,631,490 | 12/1971 | Palmieri | 342/160 |
| 3,765,017 | 10/1973 | Dentino | 342/137 X |
| 4,079,376 | 3/1978 | Kirk, Jr. | 342/93 |
| 4,214,242 | 7/1980 | Colin | 342/137 |
| 4,513,287 | 4/1985 | Penhard | 342/94 |
| 4,630,052 | 12/1986 | Galati et al. | 342/159 |
| 4,714,927 | 12/1987 | Siegel et al. | 342/160 |

FOREIGN PATENT DOCUMENTS 0807022 1/1959 United Kingdom ............ 342/137

Primary Examiner—Gilberto Barrón, Jr.
Attorney, Agent, or Firm—Fleit, Jacobson, Cohn, Price, Holman & Stern

[57] ABSTRACT

A radar system for determining first time around targets from multiple time around targets using two radar pulse trains of different pulse repetition intervals and thresholding means. Echos from pulses at each pulse repetition interval being compared to determine first time around targets from subsequent time around targets. The radar system uses thresholding levels to determine an echo and is less prone to problems of coincidence gate clashing with high duty cycles.

5 Claims, 8 Drawing Sheets

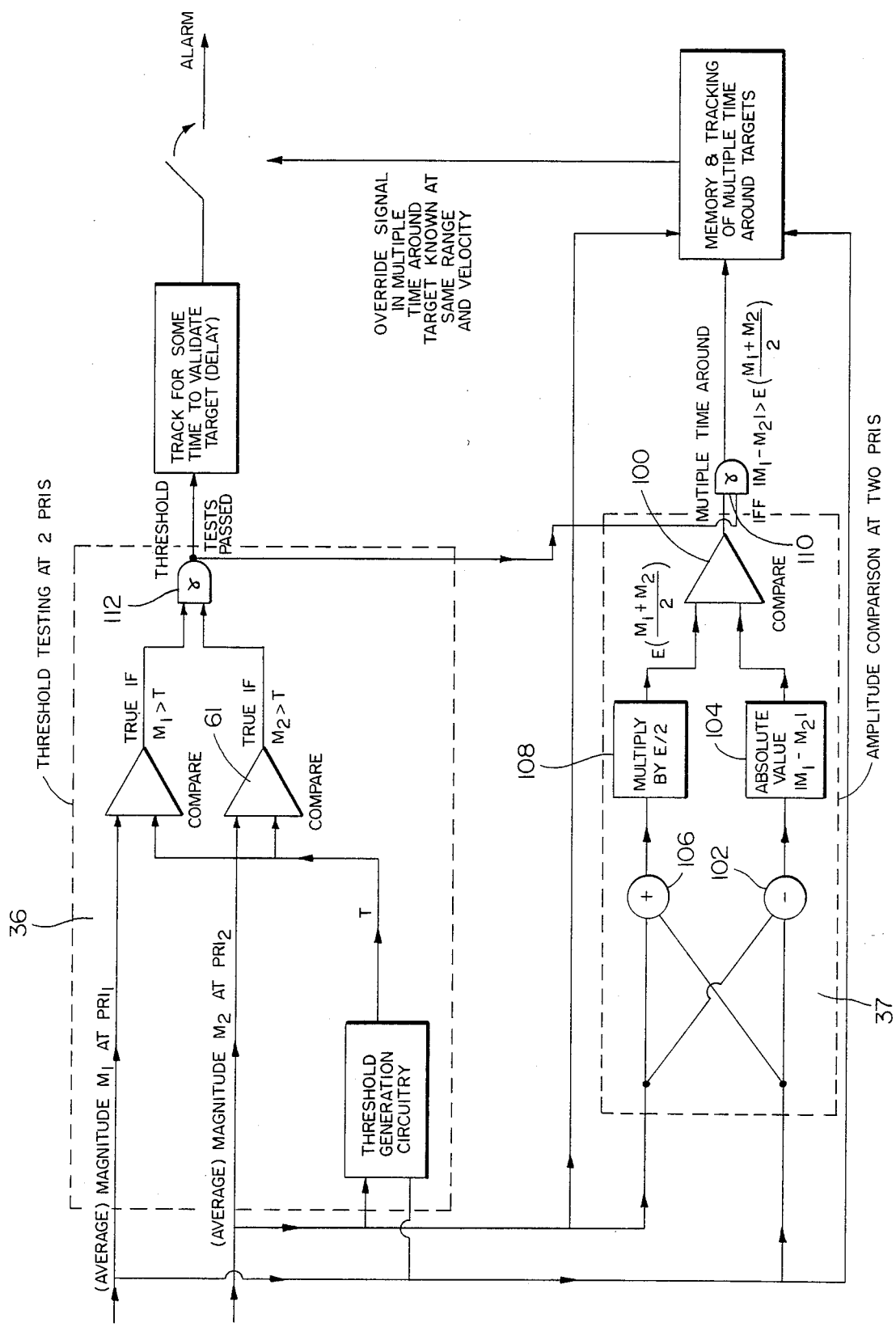

RADAR SYSTEM FOR DETERMINING FIRST TIME AROUND TARGETS FROM MULTIPLE TIME AROUND TARGETS

FIELD OF THE INVENTION

The present invention relates to a Radar System and more particularly to such a system having means for discriminating between first multi-time around targets and the present application is a continuation-in-part of U.S. patent application Ser. No. 07/033,983 filed Apr. 2, 1987, now abandoned.

BACKGROUND ART

A defence system intended to destroy incoming hostile targets may comprise a radar location system and an attack system such as missiles or guns. It is known that the range of the attach system may be limited or the effectiveness reduced with range. Consequently, it maybe desirable to deal with the incoming target only when that target is within a specific range sphere. Thus, the radar system used will have a pulse repetition interval determined by this range.

Hostile targets outside the proposed range sphere may also be detected and a problem arises when a first time around targets i.e. within the range sphere nd a second or subsequent time around target i.e. outside the range sphere differ in range by an amount such that the delay between the echo pulses received from the different targets is a multiple of the radar systems pulse repetition interval. In such a case, echo pulses from different targets arrive at the radar receiver simultaneously.

A known method of relieving the multiple time around target problem is to transmit pulse trains having different pulse repetition intervals. The delay between the different echo pulses received provides a means of distinguishing the targets. This method however becomes inaccurate when a high duty cycle is used particularly when the transmitted pulse length is significant compared to the pulse repetition interval. When this occurs, echo pulses received from the different pulse trains overlap and it may be impossible to distinguish which echo pulse has been received from which target.

STATEMENT OF THE OBJECT OF THE INVENTION

It is an objective of the present invention to provide a radar system which can more clearly distinguish first and multiple time around targets.

SUMMARY OF THE PRESENT INVENTION

In accordance with the present invention there is provided a radar system for discriminating between first and multi-time around targets comprising transmitting means for transmitting pulse trains of different pulse repetition interval and receiving means for receiving the resultant echo pulse trains from targets within range wherein circuit means is provided for comparing the amplitudes of echo pulses from different echo pulse trains having different pulse repetition intervals which are received by the receiving means and for providing an output signal indicative of whether the echo pulses have been received from a first or multi-time around target.

The radar system may comprise:
(i) Pulsed radar providing pulses of at least two pulse repetition intervals;
(ii) Threshold testing means for received echo pulses and providing an alarm output when an echo is detected.
(iii) Amplitude comparison means to compare the echo pulse amplitude received at each pulse repetition interval whereby first or multi-time around targets can be distinguished and giving an output signal indicative thereof;
(iv) Means for signal processing output signals from the threshold testing means and amplitude comparison means whereupon an alarm is raised or not.

Preferably, the system includes tracking means such that the movement of multi-time around targets is appreciated and these targets are not confused as first time around targets at false target positions.

Time-out facilities may be added to the system such that the status of multi-time around targets may be predetermined as they approach the radar site.

The radar system may include pulse thresholding means or logic elements or have radar pulses fed in tandem to different parts of the circuit or any combination of these elements.

In accordance with one embodiment of the present invention there is provided a radar system to discriminate between first and multi-time around targets comprising radar transmission and receiving means which have pulse trains of at least two different pulse repetition intervals, the respective different pulse repetition ratio being arranged to ensure pulse coincidence over a predetermined number of cycles such that pulses are distinguishable in pulse thresholding means, amplitude testing means and logic elements, the radar pulses received from a target being fed in tandem to both the thresholding means providing an alarm enabling signal to the logic element when a pulse is detected, the amplitude testing means comparing the amplitude of the pulses at the different pulse repetition intervals and providing a further signal to the logic element allowing a passage of the alarm enabling signal to an alarm device indicating a first around target if the amplitudes are substantially equal and providing a signal to inhibit the alarm enabling signal when the amplitudes are different.

BRIEF DESCRIPTION OF THE DRAWINGS

An embodiment of the present invention will now be described by way of example only with reference to the accompanying drawings in which:

FIG. 9 is a schematic diagram of arrangements of components forming the amplitude testing means and cooperating thresholding circuit in accordance with yet another embodiment of the invention.

DETAILED DESCRIPTION OF PREFERRED EMBODIMENTS

Figure 1:
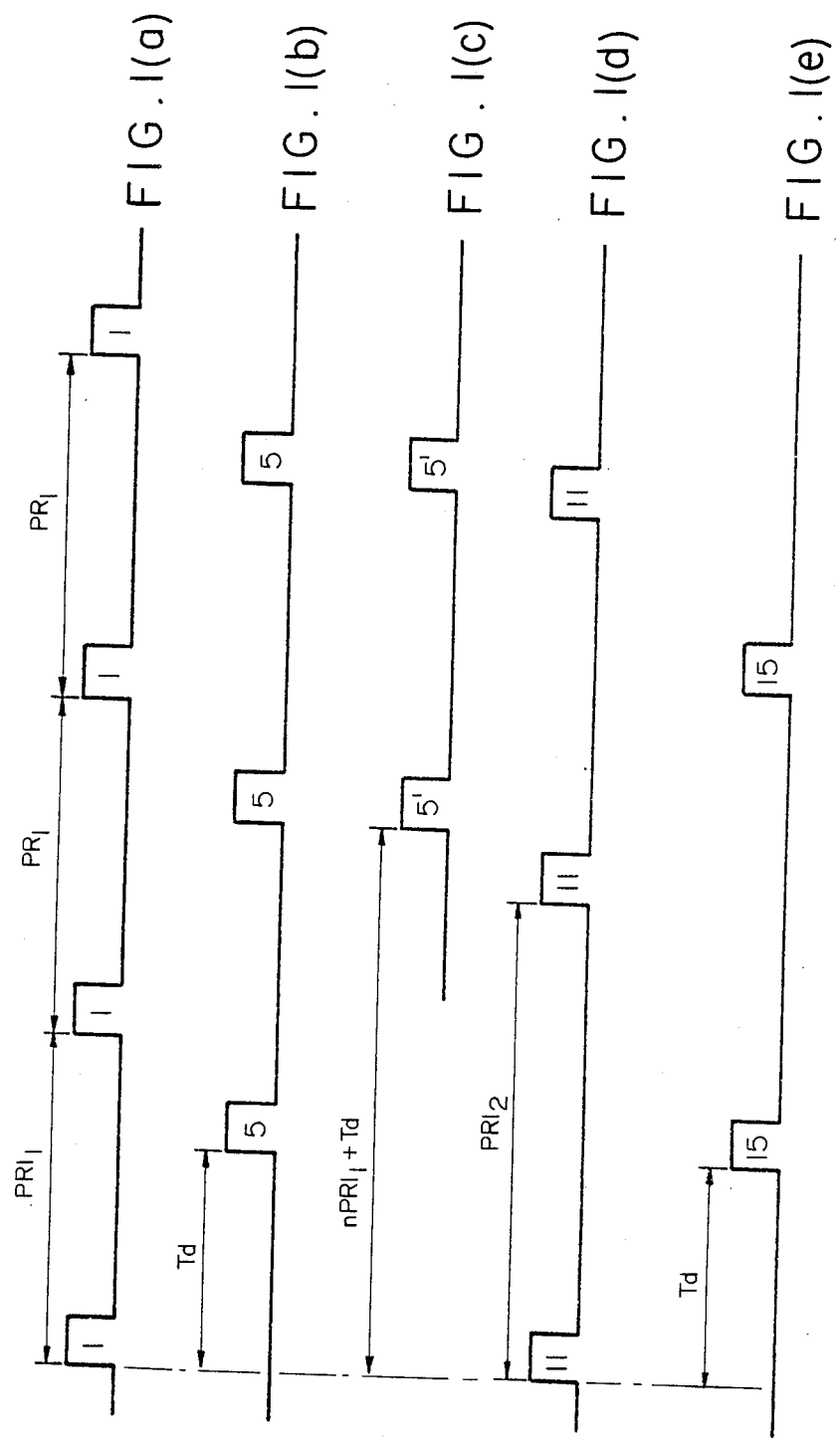
FIG. 1(a) illustrates transmitted pulses from a radar system having a relatively light duty cycle and a pulse repetition interval (PRI$_1$)
FIG. 1(b) shows received echo pulses from a first time around target reflected from transmitted pulses as illustrated in FIG. 1(a)
FIG. 1(c) shows received echo pulses from a second time around target reflected from transmitted pulses as illustrated in FIG. 1(a)
FIG. 1(d) illustrates transmitted pulses from a radar system having a pulse repetition interval (PRI$_2$)
FIG. 1(e) shows received echo pulses from a first time around target reflected from transmitted pulses as shown in FIG. 1(d)

Consider FIGS. 1(a–e), in FIG. 1(a) a train of transmitted pulses 1 is shown with a first pulse repetition interval $PRI_1$. FIG. 1(b) shows a train of received pulses 5 from a target with a delay Td indicative of the range to that target, the delay Td being less than the pulse repetition interval and considered a definition of a first time around target. FIG. 1(c) shows a second-time around pulse train i.e. echo pulses 5' from a target received at the receiver from a target with delay equal to n $PRI_1$+Td where n is an integer, which is related to a first time around echo pulse from a subsequent transmitted pulse 1. It is not possible to distinguish first-time around target echoes 5 from multi-time around target echoes 5' on the basis of a measurement of the delay time alone when using a single pulse repetition interval $PRI_1$. In FIG. 1(d) a second transmitted train of pulses 11 is shown with a second different repetition interval $PRI_2$ while FIG. 1(e) illustrates the resulting train of echo pulses 15 where the delay Td is the same, with both pulse repetition intervals $PRI_1$ and $PRI_2$ for the received pulses 5 and 15 distinguished from multiple time around target echoes such as 5'. From a comparison of FIGS. 1(c) and 1(e) for example it can be seen that pulses 5' and 15 do not occur in the same time slot so that such pulses are distinguishable by the receiver.

Echo pulses 5' from the second time around target with transmitted pulse, having a repetition interval $PRI_1$ are no longer received at the same time as echo pulses 15 from first time around targets of the transmitted pulse 11 having a repetition interval of therefore $PRI_2$. The range ambiguity is said to be resolved.

Figure 2:
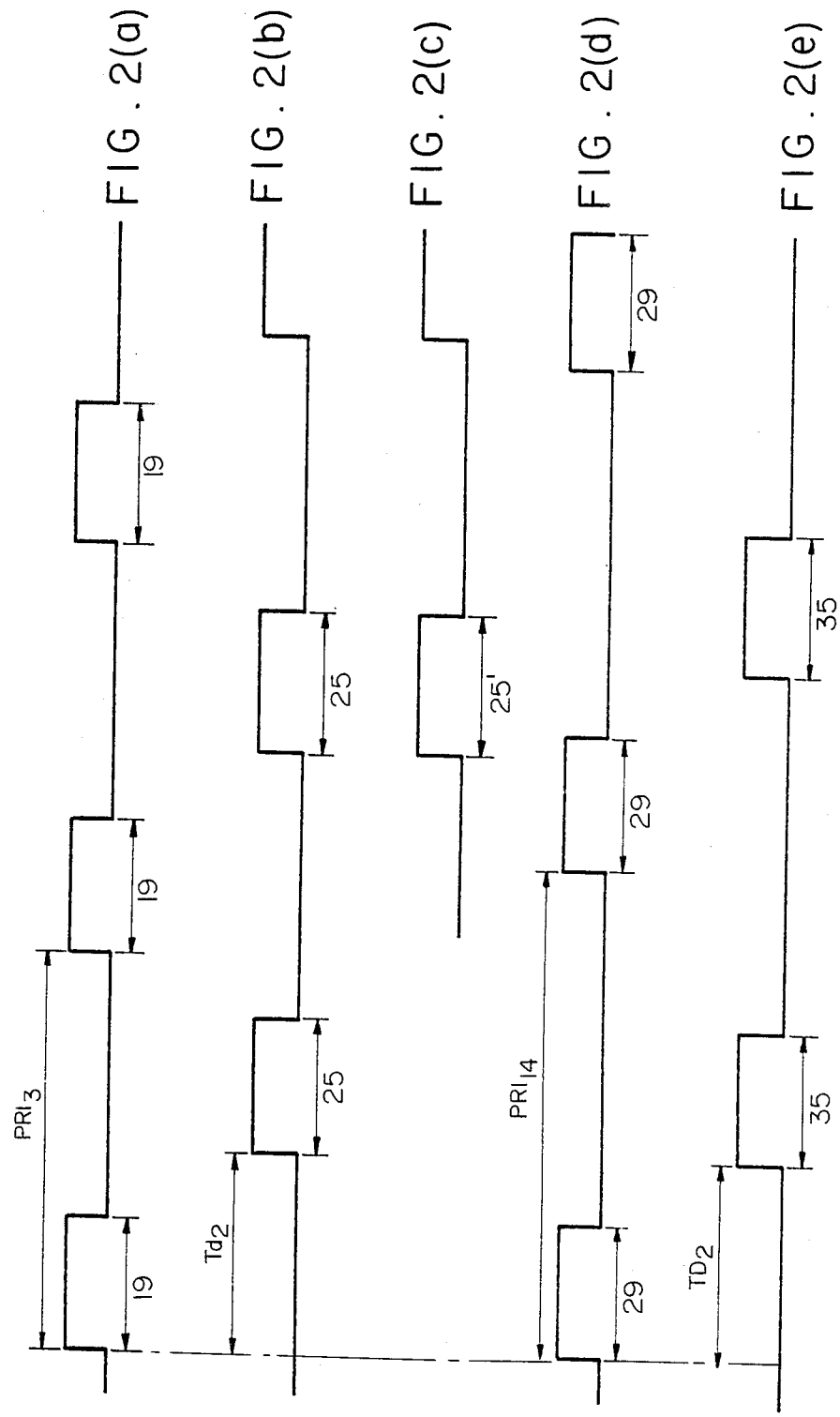
FIG. 2(a) illustrates transmitted pulses from a radar system having a relatively high duty cycle and a pulse repetition interval (PRI$_3$)
FIG. 2(b) shows received echo pulses from a first time around target reflected from transmitted pulses as illustrated in FIG. 2(a)
FIG. 2(c) shows received echo pulses from a second time around target reflected from transmitted pulse as illustrated in FIG. 2(a)
FIG. 2(d) shows transmitted pulses from a radar system having a relatively high duty cycle and a pulse repetition interval (PRI₄)
FIG. 2(e) illustrates echo pulses received from a first time around target from transmitted pulses as illustrated in FIG. 2(d)

FIGS. 2(a) and 2(d) illustrate two transmitted pulse trains with pulse repetition intervals $PRI_3$ and $PRI_4$ as shown and a target delay $Td_2$ but with a high duty cycle i.e. the pulse lengths 19 and 29 constituting a significant proportion of the pulse repetition interval $PRI_3$ or $PRI_4$. FIGS. 2(a–e) correspond with FIGS. 1(a–e) however FIGS. 2(c) and 2(e) illustrate an overlap of echo pulses having pulse lengths 25' (2nd time around echo pulse of transmitted pulse $PRI_3$) and 35 (1st time around echo pulse with transmitted pulse of $PRI_4$). Consequently first and multi-time around targets cannot be distinguished. In order to appreciate this, it should be borne in mind that the radar receiver is 'opened' for the duration of the pulse 25 or 35, each time a pulse from a certain delay is expected. For example, the radar receiver could be opened and closed following a pattern of FIG. 2(b), in which case the receiver is said to have a range gate at delay $Td_2$. Thus, due to the way in which the receiver operates, it is clear that if pulse trains from two targets overlap at all, even though they are not coincident, then both appear in the same range gate.

Transmitter technology has established a limit to peak power. Therefore, in order to get sufficient average power for the required sensitivity, a high duty cycle is necessary. Also as the received signal power drops off rapidly with range, it is important to discriminate targets in the first few multi-time around range gates.

Figure 3:
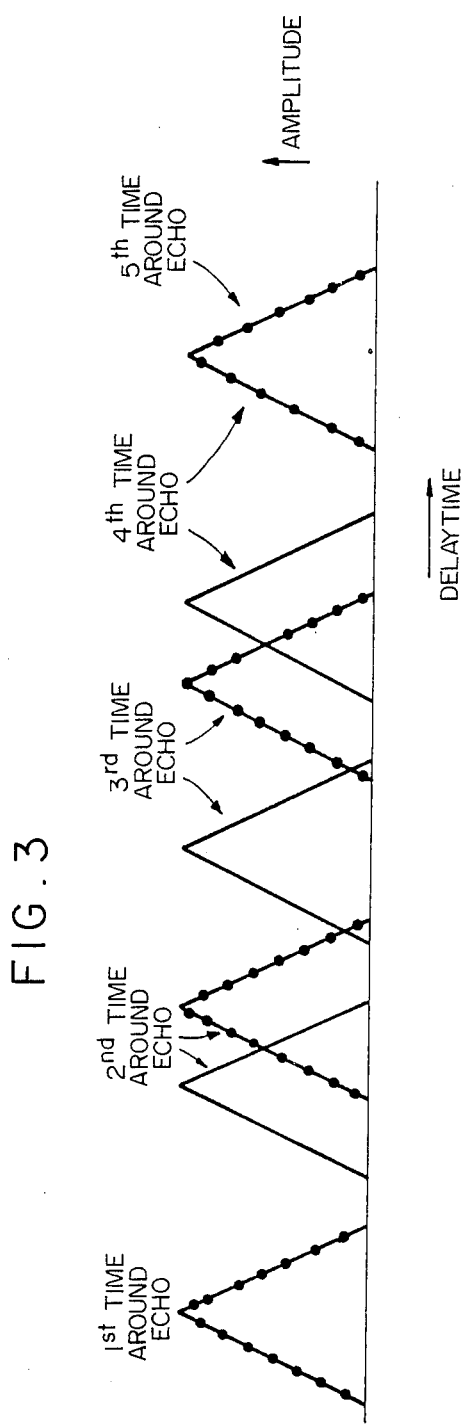
FIG. 3 illustrates a typical echo pulse response train received from a radar system according to the present invention; and, FIG. 4 shows in a systematic manner an arrangement of functional components according to the present invention.

Now considering FIG. 3, two echo pulse trains from transmitted pulse trains of different pulse repetition interval are superimposed. The fractional overlap of the receivers range gate by the pulse train from target delay is also shown, this being a measurement of the amplitude of the signal in the receiver. (No account has been taken of inverse square law attenuation with distance). In FIG. 3 it can be seen that the two pulse trains shown with different pulse repetition intervals, such a $PRI_1$ and $PRI_2$ coincide after 3 and 4 pulse repetition intervals respectively. The choice of this coinciding relation is important in providing sufficient contrast to allow identification of multi-time around targets in the first few cycles.

It can be seen from FIG. 3 that the relative amplitude at the two PRI's is the same for first-time around target echo and again when 4th time around echo of $PRI_1$ coincides with 5th time around echo of $PRI_2$. In between these two, the relative amplitude is on the whole different except for a few points (A,B,C and D). The existence of these points is due to the high duty cycle. If the pulse length were reduced, then each of the triangles in FIG. 3 would narrow until there was no overlap at all.

In the present invention pulse amplitudes at the two PRI's are compared. If the pulse amplitudes are sufficiently similar the target is considered first time around. If not, the target is taken to be multi-time around.

Furthermore, once a multi-time around target is identified then this information is stored in a receiver memory to be used if and when the multi-time around target moves to a range where the relative amplitudes would indicate erroneously a first-time around target (i.e. close to the points A,B,C and D), the information in the receivers memory over-riding the indication of a first-time around target.

Targets are continuously tracked by the system so that even multi-time around targets first detected at ranges corresponding to points A,B,C and D are still identified even though it may take several cycles.

The technique is particularly appropriate to a pulse Doppler radar where the velocity of the target is effectively measured. If a target is identified as multi-time around then it can be tracked by monitoring its velocity. If a first-time around target appears with a different velocity at the same time as the tracked multi-time around target, then the former can be recognised. In other words the technique only overrides a detection for velocities very close to that of the tracked multi-time around target.

In comparing amplitudes between the two PRI's a threshold is set which prescribes a coincidence gate wherein if two amplitudes are within that gate they are considered to coincide and a first time around target indicated. The width of the coincidence gate is actually dependent on the sum of the amplitude. The threshold is determined so that the probability of a genuine first-time around target being erroneously categorised as multi-time around due to noise is acceptably low.

Figure 4:
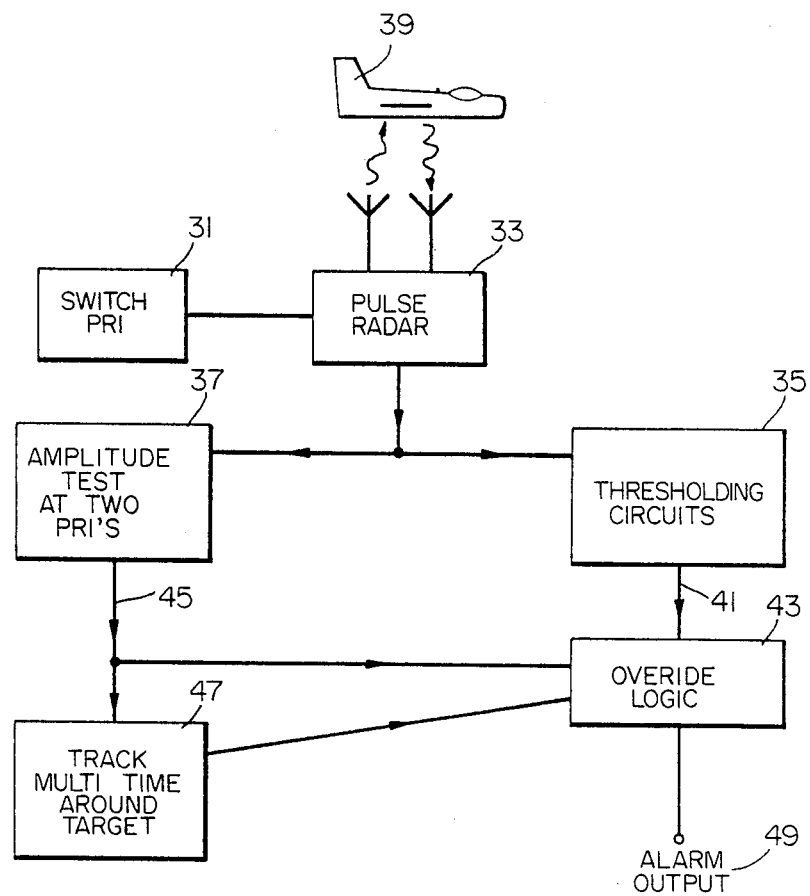

FIG. 4 illustrates in a systematic manner a method of implementing the invention. Radar pulses are transmitted under control of a switch pulse repetition interval element 31 appended to means for transmitting and receiving 33. A received echo pulse train from a target 39 is directed to conventional threshold testing circuits 36 as found in present radar systems and to amplitude testing means 37 according to the invention. The threshold testing circuits 36 are arranged to have a predetermined threshold signal level such that mere environmental noise does not activate the logic element 43. Threshold testing circuits 36 are well known to people skilled in the art. The amplitude testing means 37 comprises well known circuitry arranged to compare the amplitudes of two received signals. When the threshold testing circuits 36 establish there is a valid response signal and thus that the target 39 is present, an alarm enabling signal 41 is sent to logic element 43. The amplitude testing means 37 analyzes the received pulses at the two pulse repetition intervals identifying first and/or multi-time around targets and sending signals 45 to the logic element 43 and to a tracking device 47 determining whether the alarm enabling signal 41 from the threshold circuits 36 is passed to an alarm output device 49. The logic element 43 receives signals sent from the threshold testing circuits 36, the amplitude testing means 37 and tracking device 47. These signals are treated as logic levels in the logic element 43 such that the correct combination of logic level stimulates an appropriate signal to the alarm output device 49. The tracking device 47 acts to predict future amplitude levels for received echo pulse train by extrapolation of already received echo pulse train amplitudes. The process of expected signal extrapolation is well known. With such extrapolation or tracking of the echo pulse train in the tracking device 47, periods when the target enters "error zones A, B, C and D", can be predicted. The tracking device 47 tracks a multi-time around target such that even when it enters one of the "error" zones (i.e. A,B,C and D in FIG. 3) of the radar system it is still as a multitime around target. It should be noted that there are advantages in providing "time-out" means in the tracking device 47 and logic element 43 devices so that the incoming target is re-assessed as it approaches and becomes increasingly dangerous. The function of "time-out" can be provided simply by adding a timing element (not shown) to the tracking device 47 such that future extrapolation of the received echo pulse is begun freshly at pre-determined periods.

As will be appreciated, in the present radar system the threshold circuits 36 in performing a thresholding test and the amplitude testing means 37 in performing an amplitude test are significant elements.

There are several techniques to generate the threshold level for the thresholding areas such that a false alarm rate $P_f$ (i.e. probability of threshold crossing when only thermal noise is actually present) does not exceed some specified value. Examples of suitable techniques are illustrated below:

(i) A Fixed Threshold Level

The threshold level is a certain multiple of an expected environmental thermal noise level.

Fixed thresholds are however seldom used in modern radars, since the thermal noise level can normally be only crudely estimated, and jamming or other interference may raise the actual noise level seen at the radar;

(ii) Historical Averaging

The returned pulse threshold level is set at a certain multiple of the average magnitude of a number of previous returned pulse samples;

(iii) Range Gate Average

The threshold level is set at a certain multiple of the average magnitude of samples from several different range gates, i.e. time delays pulse transmission. However, this is not expected by itself to be a very suitable method of threshold generation for the present application, in which the range gate width is normally a large fraction of the pulse repetition interval, so that there are very few independent range gates.

(iv) Frequency Band Average

The threshold level is set at a certain multiple of the average magnitude of some or all distinct frequency band outputs of a pulse Doppler radar. For a pulse Doppler radar coherence is maintained between one pulse and the next. Filtering based on the returns from a number of successive pulses (normally all with the same pulse repetition interval, $PRI_1$ or $PRI_2$, rather than a mixture) is then used to analyse the Doppler spectrum of the returns. This enables distinct Doppler frequencies in the returns, which are related to the closing speed(s) of the target(s), to be separated out into distinct channels, referred to as frequency bands. When only thermal noise is present the frequency band outputs should all have the same average magnitude, so that a threshold for each frequency band output can be based on the average of some subset of them. (Not necessarily all, since some parts of the Doppler spectrum, such as frequencies near dc, may have anomalous behaviour, and should be excluded from the average).

A particular implementation of the Doppler thresholding or filtering can be obtained by the use of a Fast Fourier Transform (FFT). This is normally carried out in the digital part of a radar receiver, and is based on a number, M of successive returns which is a power of 2, $M=2^m$. The FFT uses complex arithmetic, and so requires both in-phase (I) and quadrature (Q) components of the returned pulses at input. The outputs of the FFT are also complex numbers in the first instance, but subsequent processing can be based on their magnitude $\sqrt{I^2+Q^2}$, or some approximation thereto.

The frequency band average is the preferred method of threshold generation for a pulse Doppler radar.

It should be noted that appropriate multiples to be used to obtain a satisfactory false alarm rate in the various implementations of the thresholding technique circuits described above are generally known from radar detection theory, e.g.. Meyer and Mayer "Radar Target Detection" Academic Press, New York, 1973.

Figure 5:
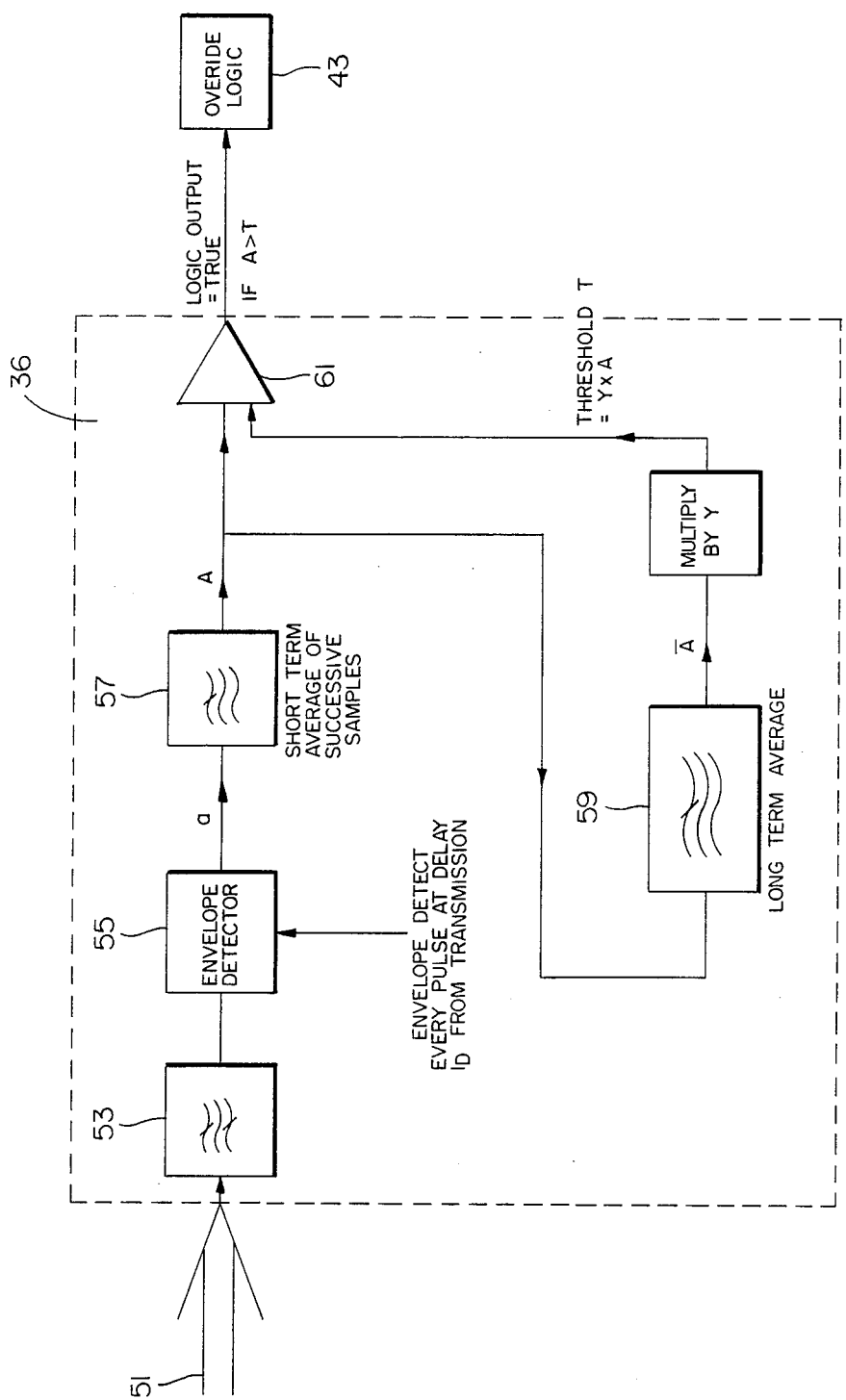
FIG. 5 is a schematic diagram of an arrangement of components forming the thresholding circuits as depicted in FIG. 4, in accordance with one embodiment of the invention.

FIG. 5 illustrates, in a schematic manner, an arrangement for the threshold circuit arrangement depicted in FIG. 5 suitable for the present invention. A returned radar pulse 51 is incident upon a band pass filter 53 arranged to act as a radar receiver. The threshold must always be a positive, real, quantity and based upon estimates of returned pulse magnitudes (or frequency band outputs for doppler radar arrangements). An envelope detector 55 is provided to give estimates of returned pulse magnitudes in FIG. 5. Alternatively with digital radar receiver arrangements, an estimate $\sqrt{I^2+Q^2}$ can be used. These returned pulse magnitude estimates are also compared to the threshold level. In FIG. 5, a short term threshold level and a longer term threshold level are generated respectively by a short term filter arrangement 57 and a longer term filter arrangement 59. The short term filter arrangement 57 provides a simple amplitude threshold for the returned pulse. This simple "hurdle" amplitude is adjust or averaged over a small number of successive returned pulse samples. The longer term filter arrangement 59 provides an average signal level and is produced by averaging a large number of successive returned pulse samples. A multiple Y is used to scale this average signal level to give the threshold T. The threshold level T is used in a comparator 61 for comparison with the received returned pulse level from the short term filter 57. The comparator 61 provides a logic output to the override logic 43 (FIG. 4) dependent upon whether the received returned pulse level A exceeds the threshold level T. The comparator 61 may be a simple differential amplifier circuit arranged to indicate which of two inputs is larger and described in "The Art of Electronics, Horowitz and Hill Cambridge University Press p. 83.

It will be appreciated that the threshold testing decision is not normally based on the returns from just one returned pulse. (The notion of a pulse repetition interval is of course meaningless for a single pulse in isolation). Instead the magnitudes of the returned pulse at the same range gate from a pulse train with constant pulse repetition interval between them may be averaged before comparison is made to the threshold level T. Where the threshold level is generated using a historical average (option II above), the averaging to generate the threshold level T must be on a much longer time scale than the averaging of the returned pulse A to the compared to the threshold level T, otherwise nonsense results. The time scale for this may be based on an estimate of the minimum time that a target is expected to remain in a particular range gate.

For a pulse Doppler radar using, for definiteness, the FFT algorithm for spectral analysis, the output of several FFT's for the same frequency band may be averaged before comparison with the threshold level. The threshold may then be based on the average of several FFT outputs as well as a number of frequency bands, so that historical averaging and band averaging are combined.

Figure 6:
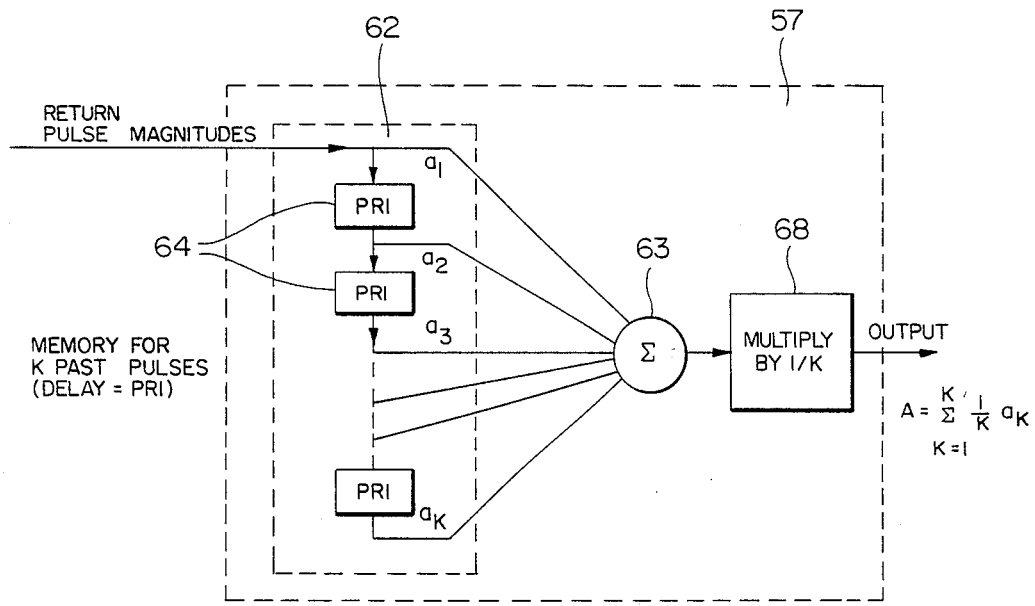
FIG. 6 is a schematic diagram of components forming the short term filter arrangement depicted in FIG. 5.

In FIG. 6, a schematic illustration for the short term filter arrangement 57 is shown. The short term average return pulse A is given by:

$$A = \sum_{k=1}^{k} \frac{1}{K} a_k \qquad \text{Eqn 1}$$

where K = number of sample pulses and a = return pulse level.

A returned pulse a is fed, in parallel, to a combiner 63 and a cascade 62 of delay elements 64, the returned pulse $a_k$ after each delay element being coupled to the combiner 63. The time delay of each delay elements 62 is equivalent to a pulse repetition interval (PRI) of the radar system. The short term average return pulse A is thus given by equation 1 above and a multiplier 68 is provided to perform this function.

Figure 7:
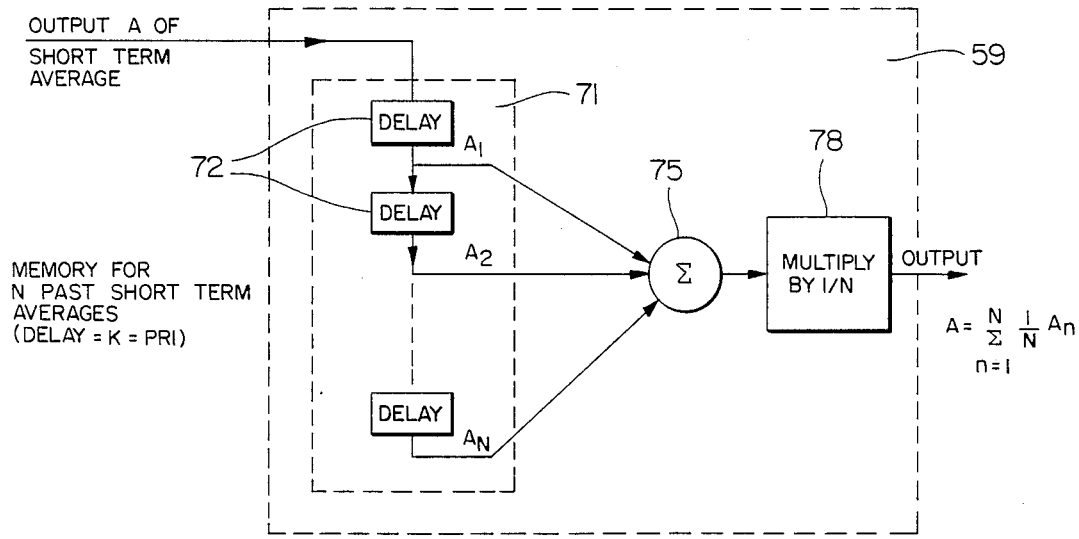
FIG. 7 is a schematic diagram of components forming the longer term filter arrangement depicted in FIG. 5.

In FIG. 7, a schematic illustration for the longer term filter arrangement 59 of FIG. 5 is shown. The longer term average return pulse A is given by:

$$A = \sum_{n=1}^{N} \frac{1}{N} A_n \qquad \text{Eqn 2}$$

where N = number of samples and A = short term average (as above).

The longer term filter arrangement 59 illustrated in FIG. 7 directs the short term average pulse A through a delay element cascade 71, each delay element having a delay equivalent to the number of samples pulses K for the short term average pulse A multiplied by a pulse repetition interval (PRI) of the radar system. The longer term number of samples N is large compared to the number K (FIG. 6). After each delay element 72 a proportion of the short term average return pulse A1-N is coupled to a combiner 75. The combiner 75 combines the pulses A1-N and directs the product $A_n$ to a multiplier 78. The multiplier 78 multiplies the product $A_n$ by 1/N, in accordance with equation 2 above to give the longer term average return pulse A.

Although FIGS. 6 and 7 illustrate a simple averaging arrangement it will be appreciated that more complex arrangements may be used incorporating signal bias and "loading" means to enhance the adaptability of the arrangement to variations in environmental factors.

It will be noted that the radar system may use more than one time delay Td the returned pulse in each range gate is then compared independently to the threshold level. The threshold level may however be averaged over all the different range gate outputs.

Figure 8:
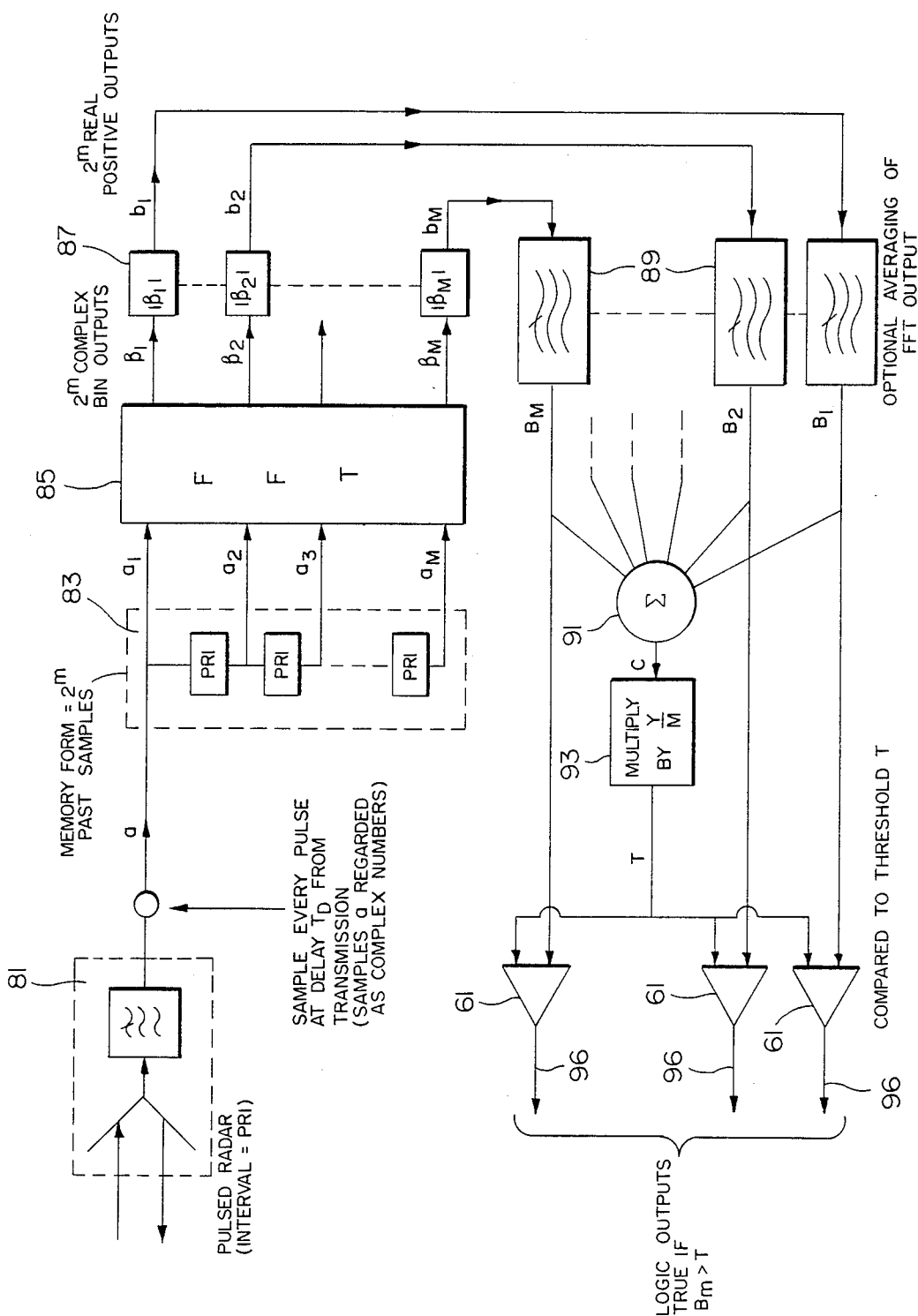
FIG. 8 is a schematic diagram of an arrangement of components for performing a threshold test in accordance with another embodiment of the invention.

FIG. 8 is a schematic diagram of a threshold test in accordance with another embodiment of the invention for pulse doppler radar using a fast fourier transform (FFT) regime. As previously, the returned radar pulse train is incident upon a detector/filter arrangement 81. The received pulse train is sampled in a prescribed range gate at the time delay Td, the sampled pulse being coupled to a delay element cascade 83 which is coupled in parallel with a fast fourier transform function module 85 with connections after each delay element and prior to the first element of the cascade 83 to prescribed M frequency bands. Both the delay element cascade 83 and the fast fourier function module 85 are readily available as integrated circuits. The delay of each element off the cascade 83 must however be set at a prescribed pulse repetition interval for the radar system whilst the fourier function module may be adapted to enhance performance in generating a respective threshold level for each frequency band. It will be noted that in accordance with the present invention the radar system has two pulse repetition intervals (PRI) consequently either switching between two delay element cascades 83 with different PRI delay elements is required or an adaptive, switchable, delay element cascade. The delay element cascade 83 injects "complex" values α1-M having in phase (I) and quadrature components, to the Fourier module 85. The Fourier module 85 performs a "complex" arithmetic function upon the values α1-M to provide "complex" output values 1-M. These "complex" output values 1-M are modularised in modulators 87 to provide "real" output values 1-M. These real output values 1-M may, optionally, be average in averaging devices 89 to give averaged output values 1-M for a respective frequency band. Consequently, either 1-M or 1-M are combined in a combiner element 91. A combined value C from the combiner 91 is then adapted by a multiplier 93 to give effective multiplication by Y/M, where Y is the multiplier or scaling factor and M is the number of frequency bands under consideration. The multiplier 93 provides the threshold level T. The threshold level T is used in comparators 61 for comparison with real outputs 1-M or, the averaged 1-M in order to give a logic signal 96 indicative of whether the real output for each frequency band 1-M is above the threshold level T.

The amplitude test 37 (FIG. 4) can be explained by consideration wherein FIG. 9, a schematic illustration of amplitude comparison and override logic defines $M_1$ as the magnitude of the returned pulse in the given range gate and, if applicable, frequency band (or velocity gate), when the pulse repetition interval is $PRI_1$ between pulses in the transmitted pulse train, while $M_2$ is defined as the corresponding magnitude of the returned pulse when the pulse repetition interval between pulses is $PRI_2$.

As with threshold testing, $M_1$ and $M_2$ are not normally based on the pulse returns from a single pulse, but rather would be the short term average of the magnitudes of the returns from a succession of pulses with constant pulse repetition interval between them, or (where a pulse Doppler radar is involved) the average of the magnitudes of the outputs for the same frequency band from several successive FFTs with the same pulse repetition interval.

$M_1$ and $M_2$ are said to be substantially the same if they agree with each other to within a certain small percentage, or, equivalently, if their difference is less than a certain small fraction, E of their average value $(M_1+M_2)/2$:

$$|M_1-M_2| < E(M_1+M_2)/2$$

If the magnitudes $M_1$ and $M_2$ are substantially the same this is an indication that the target is probably first time around target. If they are not substantially the same this suggests a multiple time around target and so that alarm signal normally generated when the threshold tests are passed would be overridden.

As a refinement there can be memory for multiple time around targets when detected (i.e. when the threshold tests are passed, but magnitudes are not substantially equal). The multiple time around targets, once detected, can be tracked so that fresh detections which might otherwise have caused alarms can be overridden when there is memory in the tracking loop of a previously detected multiple time around target which is coincidental in range and, where applicable, frequency band (or possibly in neighbouring range gates or frequency bands). This is important because it may happen for some particular ranges of the target that the magnitudes $M_1$ and $M_2$ substantially agree, even though the target is a multiple time around target i.e. A, B, C or D, (FIG. 3) but that previously before the target moved to such a special range it was detected as a multiple time around target.

Also a delay element can be inserted after the threshold tests have been passed before the alarm signal is given, to allow time for some tracking and velocity estimates to be obtained. If the amplitudes $M_1$ and $M_2$ remain substantially equal during the tracking period, and do not coincide in range and velocity with a previously detected multiple time around target the detection is validated and the alarm given, otherwise it is overridden As shown in FIG. 9, the amplitude test apparatus 37 comprises a comparator 100 arranged to compare a differential product signal ($|M_1-M_2|$) i.e. the pulse magnitude $M_1$ at pulse repetition interval 1 minus the pulse magnitude $M_2$ at pulse repetition interval 2, with scaled product signal E $((M_1+M_2)/2)$ i.e. the summation $M_1+M_2$ averaged by divided by 2 and scaled by a scaling fraction E. The differential product signal $|M_1-M_2|$ is produced by a simple subtractor 102 and modulator 104 to give an absolute real value. The scaled product signal E $((M_1+M_2)/2)$ is provided by an adder 106 which is coupled to a multiplier 108 which multiplies or scales the adder 106 output be a factor E/2. The comparator 100 compares the differential product and scaled product to give a logic output to and AND logic gate 110. The AND logic gate 100 is also coupled to an AND logic gate 112 connected within yet another of the threshold testing circuits 36' to theshold comparators 61 of at respective $PRI_1$ and $PRI_2$. If the differential product signal is determined greater than the scaled product signal by the amplitude comparator 100 then the target detected by the returned pulses at $PRI_1$ and $PRI_2$ is determined as multi-time around otherwise the target is probably first-time around when the differential signal product≦scaled product signal or $|M_1-M_2| \leq E((M_1+M_2)/2)$.

Multi-time around targets and targets determined as first time around targets may be tracked in the present radar system to confirm this initial determination. The tracking of multi-time around targets is conducted by tracking device 47 (FIG. 4) however the technique of tracking depends upon whether the radar system is a pulse Doppler radar system.

Consider first a system which is not pulse Doppler radar (so that there is no immediate estimate of target speed) but for which there may be several range gates in the receiver.

Initially targets detected in successive returned pulses (i.e. target pulses that pass the threshold level in successive returned pulses) might be identified as being the same if they occurred in adjacent range gates. Where only a single range gate or a very small number of range gates are available the requirements that are necessary before two targets are identified as must be stringent. This might be done by investigation of the ratio of magnitudes $M_1/M_2$, or one of the standard range tracking procedures, such as split gate tracking, which enable the range of the target to be estimated to better than one range gate width.

Over a longer period of time an estimate of target closing speed based on the observed rate of change of range may be built up. Such a velocity estimate may be used to provide a further check on whether a freshly detected target corresponds to a target that has been previously identified as a multiple around target, since if they are the same they should agree as regards closing speeds as well as range.

For a pulse Doppler radar system, an estimate of target closing speed is immediately available, based on the frequency band, m, in which the initial target detection is made.

If frequency band m corresponds to a Doppler frequency $f_m$ Hz the closing speed of the target should be approximately $v_m$ given by the equation $$v_m = \frac{C}{2} \frac{f_m}{f_o} \text{ m/sec}$$

Where C is the speed of light $=3\times 10^8$ m/sec and $f_o$ is the carrier frequency of the radar pulse.

Thus, in a time t seconds the range of the target would be expected to change by approximately $V_m t$. This fact may be used to aid the tracking loop, if more than one range gate is present in the receiver.

Frequency bands may be tracked from one look to the next in the same way as range gates for the non-doppler system, i.e. that in the first instance targets detected in successive returned pulses are identified as being the same if the detections occur in adjacent frequency bands. The frequency band itself provides a discrimination to test whether a previously detected multi-time around target is the same as a newly detected target, since if they are the same the detections should occur in the same or adjacent frequency bands.

The receiver type used in this radar system can be of any type, although as shown in FIG. 3 it is a matched filter type which is preferred due to its sharp echo pulse edges.

I claim:

1. A radar system for detecting a target comprising:
   radar pulse transmitting means for generating first and second radar pulse trains having different pulse repetition intervals for establishing coincidence pulses at regular intervals;
   radar pulse receiving means for receiving radar pulses reflected by the detected target at the respective different pulse repetition intervals;
   radar pulse comparing means for comparing amplitudes of the received radar pulses of the respective pulse trains for providing an output signal indicative of a first time around echo when the amplitude of the received radar pulses of the respective pulses trains are substantially equal and the absence of an output signal indicative of a multi-time around echo when the amplitude of the received radar pulses of the respective pulse trains are substantially different.

2. The radar system as claimed in claim 1, and further comprising:
   an alarm device;
   processing means coupled to the radar pulse comparing means for activating the alarm device to indicative a first time around target, said processing means including a logic element, and means responsive to substantial equality between the amplitudes of the received radar pulses for generating an alarm signal fed to the logic element, said logic element being rendered operative to activate the alarm device in response to an alarm signal being fed thereto.

3. A system as claimed in claim 1 including tracking means for recording the amplitudes of the received radar pulses during successive pulse repetition intervals and extrapolating amplitude changes of each of the received radar pulses to track movement of the detected target.

4. A system as claimed in claim 1 wherein the comparing means includes thresholding means for establishing a threshold pulse amplitude level below which the pulse amplitudes of the received pulses are ignored.

5. A system as claimed in claim 1 including logic means for preventing said indication of the detected target as the first time around in response to overlapping of the received radar pulses of the respective pulse trains at the receiving means.

* * * * *